United States Patent [19]

Jacobs et al.

[11] Patent Number: 4,512,365
[45] Date of Patent: Apr. 23, 1985

[54] PILOT VALVE FOR AN OIL AND GAS SEPARATOR

[76] Inventors: George S. Jacobs, P.O. Box 4737; R. David Anderson, 110 Pembroke, both of Wichita Falls, Tex. 76308

[21] Appl. No.: 559,325

[22] Filed: Dec. 8, 1983

[51] Int. Cl.³ .............................................. F16K 31/34
[52] U.S. Cl. ...................................... 137/413; 251/28; 251/DIG. 1
[58] Field of Search ............... 137/412, 413, 415, 173, 137/195; 251/28, DIG. 1

[56] References Cited

U.S. PATENT DOCUMENTS

| 753,999 | 3/1904 | Mosher | 137/596 |
|---|---|---|---|
| 810,237 | 1/1906 | Wadsworth | 137/413 |
| 2,064,962 | 12/1936 | Waters | 183/2.7 |
| 2,348,357 | 5/1944 | Parks | 183/2.7 |
| 2,484,102 | 10/1949 | LeValley | 251/DIG. 1 |
| 2,656,144 | 10/1953 | Frantz | 251/76 |
| 2,700,307 | 1/1955 | Thoresen | 251/DIG. 1 |
| 2,892,644 | 6/1959 | Collins | 286/26 |
| 2,997,053 | 8/1961 | Walker | 137/202 |

Primary Examiner—George L. Walton
Attorney, Agent, or Firm—Charles D. Gunter, Jr.

[57] ABSTRACT

An improved float actuated pilot valve is shown for use in an oil and gas separator. The pilot valve has a valve body with a gas inlet, a lower chamber communicating with the gas inlet, an upper chamber, a gas outlet, and a gas passage connecting the upper chamber, lower chamber, and gas outlet. An actuator piston is contained within the upper chamber and has a top stem contactable by the flapper arm of a displaceable float located within the separator. The actuator piston also has a bottom stem which is slidably received within a portion of the valve gas passage. A control piston is contained within the lower chamber and has an upper stem in contact with the actuator bottom stem and has a lower stem. The control piston has an upper sealing face which sealingly engages the opening of the gas passage into the lower chamber. A coil spring normally biases the control valve sealing face toward a closed position in contact with the gas passage opening to block the flow of gas from the gas outlet. When the liquid level within the separator rises above a predetermined limit, the displaceable float acts upon the actuator piston top stem to move the control piston out of sealing engagement with the gas passage opening, thereby allowing gas to flow from the lower chamber through the gas passage to the gas outlet. The flow of gas from the gas outlet results in a pilot signal being sent to the liquid discharge valve to open the valve and discharge liquid from the separator tank.

2 Claims, 6 Drawing Figures

PILOT VALVE FOR AN OIL AND GAS SEPARATOR

BACKGROUND OF THE INVENTION

1. Field of the Invention:

This invention relates to oil and to gas production equipment and, specifically, to improvements in oil and gas separators of the type utilizing float actuated pilot valves for controlling the discharge from the separator.

2. Description of the Prior Art:

It is well known that the flow stream from a petroleum well contains oil and gas portions with the gas portion remaining in solution in the liquid at well pressures. It is also known that if the liquid having these gaseous constituents in solution is opened to the atmosphere that the gases will come out of solution. Oil and gas separators are thus provided for gradually reducing the pressure on the petroleum liquid produced, thereby allowing the evolved gases to be taken away or removed from contact with the liquid. The remaining liquid can be separated into water and oil portions and the oil so produced will constitute a greater volume and increased yield than when the petroleum flow from the well is "flashed" to the atmosphere.

A typical oil and gas separator includes a tank or vessel having a input line for receiving the petroleum flow from the well and having a gas outlet at the top and a liquid discharge outlet at the bottom of the vessel. A liquid level controller is provided which uses a "float" or displacement type sensor to transmit changes in the liquid level in the tank to a pilot valve outside the vessel. The pilot valve in turn, signals a discharge valve in the discharge outlet from the vessel to open or close the discharge valve in response to the liquid level within the vessel.

In the past, pilot valves associated with the float type controller have generally been operated pneumatically, utilizing a supply gas pressure taken from the production gas. When the liquid level in the vessel was within the desired limit, the supply gas was vented through the pilot valve to the atmosphere. When the liquid level rose sufficiently and changed the position of the float, the supply gas was diverted within the pilot valve to thereby provide a control signal to the discharge valve to allow liquid to flow from the vessel.

Such float controller and pilot valve devices are known as "constant bleed control" devices in the industry and are straightforward and reliable controllers for oil and gas separators. However, since the supply signal gas is bled to the atmosphere until the liquid level reaches a predetermined limit within the separator, a certain amount of energy is wasted which could be recovered. A typical constant bleed control device consumes supply gas at a rate in the neighborhood of 350,000 standard cubic feed per year. It would be desirable in terms of energy conservation and depletion of natural resources to recover or prevent the waste of the supply gas which is bled to the atmosphere in presently existing bleed control devices.

SUMMARY OF THE INVENTION

A float actuated pilot valve is shown for an oil and gas separator of the type having a float responsive to the liquid level in the separator for applying a biasing force to the pilot valve and which has a discharge valve associated with the separator and the pilot valve for discharging liquid from the separator when the float biases the pilot valve. The pilot valve has a valve body with a gas inlet, a lower chamber communicating with the gas inlet, an upper chamber, a gas outlet, and a gas passage connecting the upper chamber, lower chamber, and gas outlet. An actuator valve is contained within the upper chamber and has a top stem which is contacted by the float through the top opening and has a bottom stem which is slidably received within a portion of the gas pressure. A control valve is contained within the lower chamber and has an upper stem in contact with the actuator bottom stem and has a lower stem. The control valve has an upper sealing face which is adapted to sealingly engage the opening of the gas passage into the lower chamber. Biasing means normally bias the control valve sealing face toward a closed position in contact with the gas passage opening to block the flow of gas from the gas outlet until the float acts upon the actuator valve through the valve top opening.

Additional objects, features, and advantages will be apparent in the written description which follows.

DETAILED DESCRIPTION OF THE INVENTION

Figure 1:
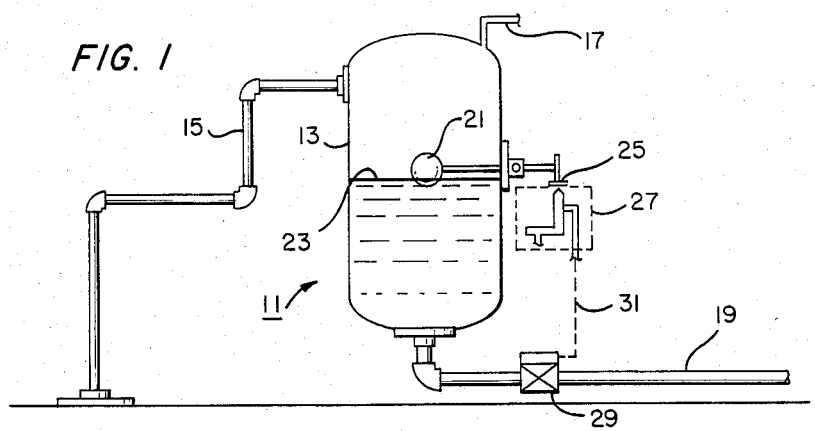
FIG. 1 is a schematic view of an oil and gas separator featuring the pilot valve of the invention.

FIG. 1 shows an oil and gas separator designated generally as 11. The separator 11 includes a tank 13 having an inlet line 15 for supplying petroleum liquid from the well, a gas outlet 17 and a liquid outlet 19. The separator 11 has a float 21 which is responsive to the level of liquid 23 in the separator 11 for applying a biasing force through a flapper 25 to a controller 27 (indicated in simplified fashion by dotted lines in FIG. 1).

The separator 11 also has a discharge valve 29 for discharging liquid from the separator through the outlet line 19 when a pilot signal is received through line 31 from the controller 27.

Thus, as shown in FIG. 1, the liquid 23 is allowed to reside within the separator 11 until the gaseous constituents separate and pass through the gas outlet 17. If the liquid level 23 rises above a predetermined point, the float 21 acts upon the controller through the flapper 25 to cause a pilot signal to be sent through the line 31 to the discharge valve 29 causing the valve to open and allow liquid to be drained from the tank through liquid outlet 19.

Figure 2:
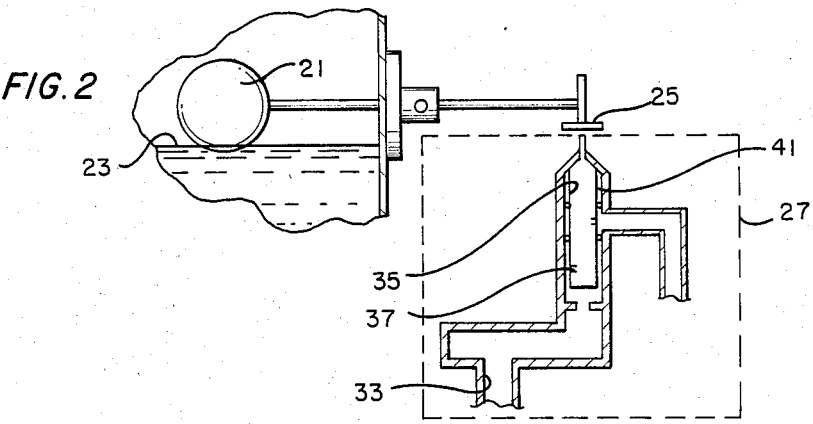
FIG. 2 is a close-up schematic view of the float actuated pilot valve of FIG. 1.
Figures 3, 4:
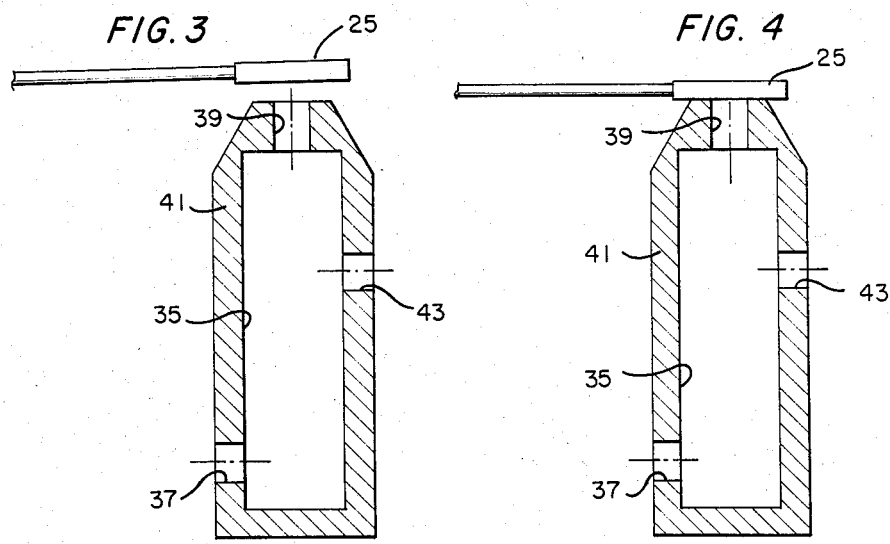
FIG. 3 is a schematic view of a prior art pilot valve in the open position.
FIG. 4 is a schematic view of a prior art pilot valve similar to FIG. 3., but in the closed position.

FIGS. 2–4 show the operation of the prior art pilot valve utilized within the controller 27. Supply gas was admitted to the controller through a supply line 33 and to the pilot valve interior 35 through a gas inlet 37. As shown in FIG. 3, when the flapper 25 was out of contact with the top opening 39 in the pilot valve 41, the supply gas was vented to the atmosphere through the top opening 39. Because pressure was not allowed to build up within the valve interior 35, the pilot signal from gas outlet 43 was not sufficient to signal the discharge valve 29 to open. As shown in FIG. 4, when the flapper 25 was biased downwardly to contact and close the top opening 39, the supply gas entering inlet 37 built up within the valve interior 35 and passed out the gas outlet 43 to signal the discharge valve 29 to open. The disadvantage with this system was that when the liquid level 23 was within acceptable limits within the tank 13, the flapper 25 was in the position shown in FIG. 3 and supply gas entering inlet 37 was continuously bled to the atmosphere through top opening 39.

Figure 5:
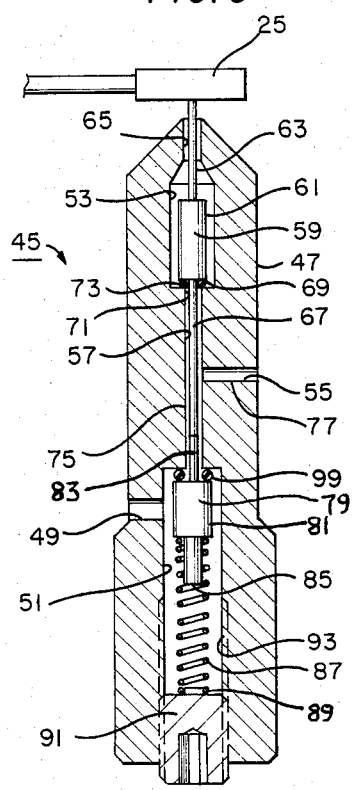
FIG. 5 is a side, cross-sectional view of a pilot valve of the invention, showing the operation thereof.
Figure 6:
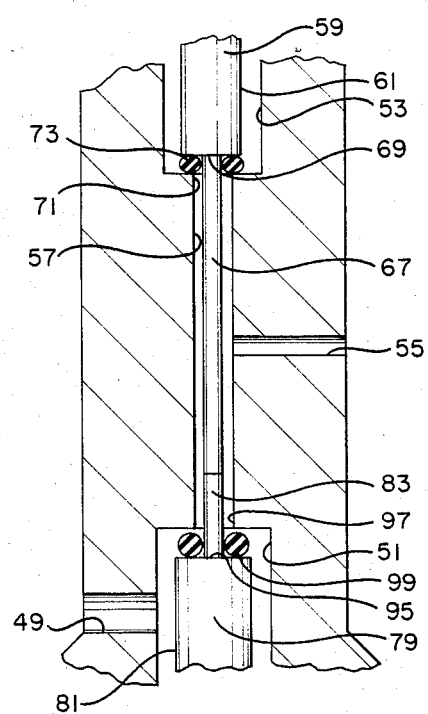
FIG. 6 is a close-up, side, cross-sectional view of the valve of FIG. 5., with portions broken away.

Applicants' improved pilot valve is shown designated generally as 45 in FIGS. 5 and 6. Applicants pilot valve 45 includes a valve body 47 having a gas inlet 49, a lower chamber 51 communicating with the gas inlet 49, and upper chamber 53, a gas outlet 55, and a gas passage 57 connecting the upper chamber 53, lower chamber 51 and gas outlet 55.

An actuator valve 59 is contained within the upper chamber 53 and has a mid portion 61 which narrows in external diameter to form a top stem 63 which is received within a top opening 65 in the valve body 47. As shown in FIG. 5, the top stem 63 is contactable by the flapper 25. The actuator valve 59 also has a bottom stem 67 which is slidably received within a portion of the gas passage 57. Actuator valve 59 has a sealing face 69 for contacting and sealing the gas passage opening 71 communicating by means of passage 57 with the upper chamber 53. A resilient seal means, such as O-ring 73, seals the opening 71 when the actuator valve 59 is biased downwardly by the flapper 25.

As shown in FIG. 5, the gas passage 57 is a T-shaped passage having a vertical leg or portion 75 and a horizontal leg 77 arranged normal thereto which terminates in gas outlet 55.

A control valve 79 is contained within the lower chamber 51 and has a mid portion 81 which decreases in external diameter to form an upper stem 83 which is slidably received within the vertical leg 75 of the gas passage 57 and which contacts the bottom stem 67 of actuator valve 59. The control valve 79 also has a lower stem 85 of greater external diameter than upper stem 83. A biasing means such as coil spring 87 is received within the lower chamber 51 about the lower stem 85. The spring end 89 opposite lower stem 85 contacts a threaded plug 91 which is contained within the threaded interior 93 of the valve body 47 which biases the control valve 79 in the direction of the actuator valve. Control valve 79 also has an upper sealing face 95 (FIG. 6) for contacting gas passage opening 97 which communicates the lower chamber 51 with the gas passage 57. Resilient seal means, in this case O-ring 99, are contained between the control valve sealing face 95 and the opening 97 for sealing off the opening 97 when the control valve 79 is in the position shown in FIG. 5.

FIG. 6 is a close-up view of the actuator valve 59 and the control valve 79 and the operation thereof. As will be evident from FIG. 6, the upper stem 83 of the control valve 79 is of lesser relative length than the bottom stem 67 of the actuator valve 59, although stems of equal length can be utilized as well. Also, the cross-sectional area presented by the sealing face 69 of actuator valve 59 is smaller than the cross-sectional area presented by the upper sealing face 95 of the control valve 79. In other words, the relative diameter of the control valve mid portion 81 is greater than the diameter of the mid portion 61 of the actuator valve 59. The diameter of the O-ring 99 adjacent opening 97 is also slightly larger than the diameter of the O-ring 73 adjacent opening 71.

The operation of the improved pilot valve will now be described. When the liquid level 23 (FIG. 1) within the tank 13 is within the desired limits, the flapper 25 exerts no downward biasing force upon the actuator valve 59 and the valve is in the position shown in FIG. 5. The coil spring 87 forces the control valve 79 in the direction of the opening 97 and compresses O-rings 99 to block the passage of supply gas entering the lower chamber 51 from the gas passage 57. When the liquid level 23 (FIG. 1) in the tank 13 rises above a predetermined limit, the float 21 causes flapper 25 to exert a downward biasing force upon the top stem 63 of actuator valve 59. As a result as shown in FIG. 6, the O-rings 73 adjacent opening 71 are further compressed allowing the bottom stem 67 of actuator valve 59 to force the upper stem 83 of control valve 79 in the direction of the valve plug 91. As a result, the O-rings 99 are relaxed allowing supply gas entering the lower chamber 51 to pass through the opening 97 and through the gas passage 57 and out the gas outlet 55. The gas pressure passing through outlet 55 causes a pilot signal to be sent through the line 31 (FIG. 1) to the liquid discharge valve 29, causing the valve to open and allowing liquid to be discharged from the tank 13 through the liquid outlet 19.

When the liquid level 23 has dropped sufficiently, the biasing force of the flapper 25 upon top stem 63 is removed allowing the valve to return to the position shown in FIG. 5. Although some residual gas pressure exists within the gas passage 57, the cross-sectional area of the sealing face 95 of control valve 79 prevents the control valve from moving out of sealing engagement with the opening 97 and thus prevents the flow of supply gas from the lower chamber 51 into the gas passage 57.

The operation of the pilot valve has been described in terms of discharging liquid from the tank 13 when gas pressure passes through outlet 55 of the pilot valve 45. It should be understood that, depending upon the operation of the particular controller 27 chosen, the operation could be exactly reversed. That is, the liquid discharge valve 29 could remain open until gas pressure was communicated through outlet 55. The operation of the pilot valve actuator and control valves 59, 79 would be the same in either case.

An invention has been provided with significant advantages. The improved pilot valve has a unique dual piston system which contains the supply gas within the valve lower chamber until the valve is actuated. When the valve is actuated, the pistons are shifted to allow supply gas to pass through the valve gas outlet to provide a pilot signal to the separator discharge valve. The supply gas pressure is not vented to the atmosphere during the normal operating state of the valve, as was true in prior designs. Applicants' improved pilot valve is simple and reliable in design and inexpensive to manufacture. The outer configuration of applicants' pilot valve is identical to prior valve designs allowing the improved valve to be quickly substituted in existing controllers. The design can save a significant amount of production gas over the conventional constant bleed control devices presently known in the industry.

While the invention has been shown in only one of its forms, it is not thus limited but is susceptible to various changes and modifications without departing from the spirit thereof.

I claim:

1. A float actuated pilot valve for an oil and gas separator of the type having a float responsive to the liquid level in said separator for applying a biasing force to said pilot valve, and a discharge valve associated with said separator and said pilot valve for discharging liquid from said separator when said float biases said pilot valve, the improvement comprising:

a pilot valve body having a gas inlet, a lower chamber communicating with said gas inlet, an upper chamber having a top opening, and a vertically oriented gas passage connecting said upper chamber and lower chamber;

a horizontally oriented gas outlet located in said pilot valve body between said upper and lower chambers and communicating with said gas passage;

an actuator valve contained within said upper chamber having a top stem which extends from said top opening for contact with said float, and a bottom stem slidably received within a portion of said, vertically oriented gas passage, said actuator valve having a lower sealing surface adapted to sealingly engage an opening of said vertically oriented passage into said upper chamber when said float contacts said top stem;

a control valve contained within said lower chamber having an upper stem in contact with said actuator bottom stem and having a lower stem, said control valve having an upper sealing surface adapted to sealingly engage an opening of said vertically oriented gas passage into said lower chamber;

resilient seal means contained in said upper chamber between said actuator valve sealing surface and said gas passage and contained in said lower chamber between said control valve sealing surface and said gas passage; and biasing means for normally biasing said control valve sealing face toward said resilient seal means to block the flow of gas from said gas outlet, the biasing force of said float on said actuator valve top stem serving to compress said upper chamber resilient seal means and to relax said lower chamber resilient seal means whereby gas is allowed to flow from said lower chamber through said vertically oriented gas passage and out said gas outlet to open said discharge valve and discharge liquid from said separator, and the upper resilient seal means being spaced from its sealing surface to allow venting between said gas outlet and the atmosphere through the upper chamber when said biasing means biases the lower resilient seal means toward its sealing surface.

2. The float actuated pilot valve of claim 1, wherein said actuator valve lower sealing surface is of lesser relative cross sectional area than said control valve upper sealing surface to allow any residual gas pressure within said gas outlet and vertically oriented gas passage to be vented past said actuator valve and out said top opening absent the biasing force of said flapper on said top stem.

* * * * *